(12) United States Patent
Kimura et al.

(10) Patent No.: US 6,802,351 B1
(45) Date of Patent: Oct. 12, 2004

(54) PNEUMATIC TIRES

(75) Inventors: Takahiro Kimura, Kodaira (JP); Hiroyuki Kato, Hachioji (JP); Takaya Yamanaka, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 192 days.

(21) Appl. No.: 09/606,939

(22) Filed: Jun. 30, 2000

(30) Foreign Application Priority Data

| Jul. 2, 1999 | (JP) | 11-189126 |
| Jan. 13, 2000 | (JP) | 2000-004348 |
| Jan. 14, 2000 | (JP) | 2000-005637 |

(51) Int. Cl.$^7$ .................. B60C 9/00; B60C 15/00; B60C 15/06
(52) U.S. Cl. ............. 152/539; 152/542; 152/543; 152/546; 152/550; 152/552; 152/554; 152/555
(58) Field of Search .............. 152/539, 541, 152/543, 548, 552–554, 542

(56) References Cited

U.S. PATENT DOCUMENTS

| 4,706,725 A | * 11/1987 | Okuni ................ 152/541 |
| 4,846,238 A | * 7/1989 | Kadota ............... 152/554 |
| 4,922,985 A | 5/1990 | Gasowski et al. ...... 152/543 |
| 5,029,627 A | * 7/1991 | Ochiai ................ 152/510 |
| 5,261,476 A | * 11/1993 | Kobayashi ............ 152/541 |
| 5,431,209 A | 7/1995 | Kajiwara et al. ...... 152/454 |
| 5,779,829 A | 7/1998 | Prakash et al. ....... 152/540 |
| 5,961,756 A | * 10/1999 | Ahouanto ............. 152/540 |
| 6,109,320 A | * 8/2000 | Miyazaki et al. ...... 152/540 |
| 6,530,411 B1 | * 3/2003 | Tsukagoshi et al. .... 152/552 |

FOREIGN PATENT DOCUMENTS

| DE | 2936337 | 3/1981 |
| EP | 0823341 | 2/1998 |
| FR | 1328752 | 12/1963 |
| GB | 1000113 | * 8/1995 |
| JP | 52-75702 | * 6/1977 |
| JP | 64-30808 | * 2/1989 |
| JP | 08040026 A | 2/1996 |
| JP | 09156310 A | 6/1997 |
| JP | 11321244 A | 11/1999 |
| WO | 99/48708 | 9/1999 |

OTHER PUBLICATIONS

European Search Report Feb. 20, 2001.

* cited by examiner

*Primary Examiner*—Jeff H. Aftergut
*Assistant Examiner*—Justin Fischer
(74) *Attorney, Agent, or Firm*—Sughrue Mion, PLLC

(57) ABSTRACT

A pneumatic tire comprises a tread portion, a pair of sidewall portions and a pair of bead portions and a radial carcass of at least one rubberized carcass ply containing steel cord therein and wound around the bead core to form a part or a whole of a wound portion of the carcass ply as a wind contact part along the peripheral face of the bead core, wherein at least one steel cord reinforcing layer is arranged in the bead portion.

18 Claims, 9 Drawing Sheets

PNEUMATIC TIRES

BACKGROUND OF THE INVENTION

1. Field of the Invention

This invention relates to a pneumatic tire having an excellent bead portion durability, and more particularly to a heavy duty pneumatic radial tire for use in truck, bus and the like.

2. Description of Related Art

In the conventional heavy duty pneumatic radial tire, it is general that as partly and sectionally shown in FIG. 1, at least one carcass ply c is toroidally extended between a pair of bead cores bc embedded in the respective bead portions b through a tread portion and sidewall portions and turned up around the bead core bc from an inside of the tire toward an outside thereof in a widthwise direction of the tire. In such a structure of the bead portion, when the tire is assembled onto a rim and run under loading, a part of the bead portion located outward from a rim flange rf in a radial direction is repeatedly subjected to a deformation falling down outward in a widthwise direction of the tire, whereby stress concentration is caused in a turnup end of the carcass ply c and hence there is caused a problem that separation failure is apt to be caused at a turnup end of the carcass ply.

In order to solve the separation failure at the turnup end of the carcass ply, it is usual to arrange a bead portion reinforcing layer along an outside of the turnup portion of the carcass ply so as to extend over the turnup end. This bead portion reinforcing layer is a rubberized steel cord layer usually called as a wire chafer. The arrangement of such a reinforcing layer is advantageous to control the bending deformation of the bead portion to prevent the separation failure at the turnup end. However, stress is apt to concentrate in an end position of the reinforcing layer and there is caused a fear of creating troubles such as cracking of the bead portion and the like in the end position, and hence it becomes impossible to effectively enhance the bead portion durability.

As the tendency of flattening the tire is recently increasing, input to the bead portion becomes more severe and hence the control of separation failure at the turnup end is insufficient even when the bead portion is reinforced with the reinforcing layer.

In order to prevent the occurrence of separation failure at the turnup end, therefore, it is proposed to wind the turnup portion of the carcass ply around the bead core to locate the turnup end thereof in a zone of the bead portion having a small strain without using the bead portion reinforcing layer as disclosed in JP-A-9-156310. In this case, the strain concentration at the wound end of the carcass ply is largely mitigated to prevent the occurrence of separation failure at the wound end. However, the turnup portion of the carcass ply is replaced with the portion of the carcass ply wound around the bead core, whereby the resistance of the bead portion to the fall-down deformation is decreased and fatigues in an outer surface part of the bead portion contacting with a vicinity of an outer peripheral edge of a rim flange and in a bead heel part contacting with a base part of the rim flange are particularly increased, and hence there is caused a problem that fatigue breakage from these parts can not be eliminated.

SUMMARY OF THE INVENTION

It is, therefore, an object of the invention to advantageously solve the aforementioned problems of the conventional techniques and to provide a pneumatic tire having an excellent bead portion durability by preventing the occurrence of separation failure at the wound end of the carcass ply and effectively eliminating the fatigue breakage of the bead portion.

According to the invention, there is the provision of in a pneumatic tire comprising a tread portion, a pair of sidewall portions and a pair of bead portions and a carcass toroidally extending between a pair of bead cores embedded in the respective bead portions and comprised of at least one rubberized carcass ply containing steel cord(s) therein, in which the carcass ply is wound around the bead core from an inside of the tire toward an outside thereof in a radial direction to form a part or a whole of a wound portion of the carcass ply as a wind contact part along the peripheral face of the bead core, the improvement wherein at least one steel cord reinforcing layer is arranged in the bead portion.

The carcass ply in the invention includes a carcass ply containing many steel cords arranged at a cord angle of about 70–90° with respect to an equatorial plane of the tire and a carcass ply formed by folding a single steel cord at a position corresponding to the wound part of the carcass ply and extending in the circumferential direction of the tire while detouring. Moreover, in the formation of the wind contact part, it is favorable that the carcass ply is subjected to plastic deformation in at least one of positions corresponding to corner parts of the bead core.

The term "steel cord reinforcing layer" used herein means a bead portion reinforcing layer made of rubberized steel cords. The arranging region of the steel cord reinforcing layer may be arranged either inside and outside the bead core in the widthwise direction of the tire including an inner peripheral side of the bead core.

According to the above bead portion structure in the pneumatic tire according to the invention, the occurrence of separation failure at the wound end of the carcass ply can be prevented by winding the side portion of the carcass ply around the bead core along the outer peripheral face thereof. And also, the given number of the steel cord reinforcing layers are arranged in the required region of the bead portion to enhance the lateral rigidity of the bead portion, whereby the outward fall-down deformation of the bead portion in the widthwise direction of the tire can effectively be controlled in the running of the tire under loading or the like to sufficiently prevent the occurrence of fatigue breakage of a part of the bead portion contacting with a rim flange or the like.

In a preferable embodiment of the invention, when using two or more steel cord reinforcing layers, a main body of the carcass ply other than the wound portion is sandwiched between two steel cord reinforcing layers in a thickness direction thereof. In this case, steel cords constituting one of the steel cord reinforcing layers are extended in a direction opposite to at least one of a cord extending direction of the other steel cord reinforcing layer and a cord extending direction of the carcass ply.

When the main body of the carcass ply is sandwiched between the two steel cord reinforcing layers, the lateral rigidity of the bead portion can be more enhanced as compared with the case that one steel cord reinforcing layer is arranged along the inside or outside of the main body of the carcass ply in the widthwise direction of the tire, whereby the fear of causing the fatigue breakage of the bead portion can effectively be eliminated to largely improve the bead portion durability. This is particularly conspicuous when the cord extending directions are opposite between the steel cord reinforcing layers and/or between the steel cord reinforcing layer and the carcass ply. In the latter case, the rigidity of the bead portion can be further increased.

In another preferable embodiment of the invention, the steel cords constituting the steel cord reinforcing layer have a cord diameter of 1.00–1.50 mm, and a free end of the steel cord has a flare having a scattering width within a range of 1.0–1.5 times the cord diameter, and the steel cords are arranged in the steel cord reinforcing layer at a distance between the cords of 1.00–1.50 mm in a direction perpendicular to a longitudinal axis of the cord, and the steel cord constituting the steel cord reinforcing layer is a Z-lay outer-sheath structure.

The term "scattering width of flare" used herein means a component of a longitudinally scattered length perpendicular to the cord axis.

In the other preferable embodiment of the invention, a start end of the steel cord reinforcing layer located at a side of a main body of the carcass ply is arranged so that a shortest distance (L) measured outward from a normal line (n) drawn at a first rim line position to an outer face of the bead portion in the radial direction of the tire is positioned within a range of 15–25 mm, while a terminal end of the steel cord reinforcing layer located at a side of the wind contact part of the carcass ply is arranged so as to position within a range sandwiched between a vertical line (m) drawn from an outermost end position of the bead core in the radial direction to the outer face of the bead portion and the normal line (n).

The term "first rim line position" used herein means an outermost end of an outer surface portion of the tire contacting with a rim in the radial direction when the tire is assembled onto a standard rim and a maximum air pressure and a maximum load capacity are applied thereto.

In a further preferable embodiment of the invention, at least one organic fiber chafer is arranged at the side of the wind contact part of the carcass ply so as to cover the terminal end of the steel cord reinforcing layer. In this case, the organic fiber cords constituting the organic fiber chafer are arranged at a cord angle of 15–75° with respect to an arranging direction of the steel cords constituting the steel cord reinforcing layer. Thus, the occurrence of separation failure at the terminal end of the steel cord reinforcing layer can be more controlled.

In a still further preferable embodiment of the invention, a cushion rubber layer is interposed between the main body of the carcass ply and the start end portion of the steel cord reinforcing layer. In this case, the cushion rubber layer at the position of the start end of the steel cord reinforcing layer has a rubber gauge of 1.5–2.0 mm viewing a section in a widthwise direction of the tire. Thus, the occurrence of separation failure at the start end of the steel cord reinforcing layer can be more controlled.

BRIEF DESCRIPTION OF THE DRAWINGS

The invention will be described with reference to the accompanying drawings, wherein.

DESCRIPTION OF PREFERRED EMBODIMENTS

Figure 2:
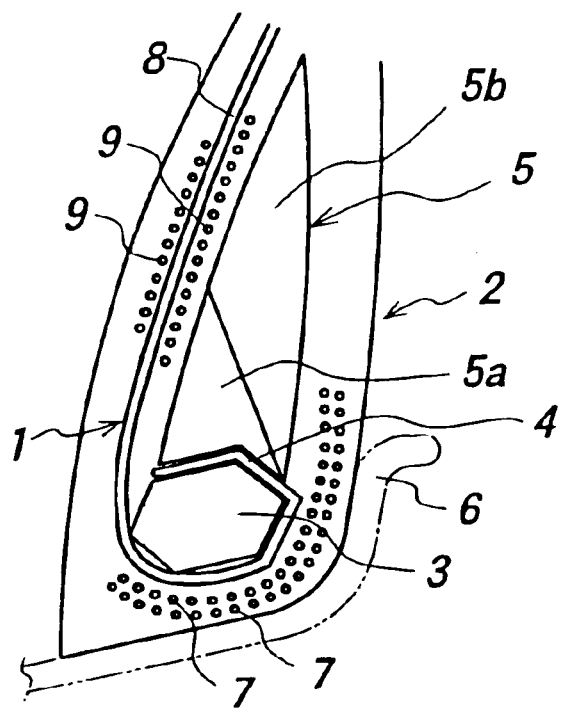
FIG. 2 is a diagrammatically section view illustrating a first embodiment of the bead portion structure in the pneumatic tire according to the invention.

In FIG. 2 is partly and sectionally shown a first embodiment of a bead portion in the pneumatic tire according to the invention. Numeral 1 is a single carcass ply, which toroidally extends from a tread portion (not shown) through a sidewall portion (not shown) up to a bead portion 2 and contains steel cords arranged at a cord angle of about 70–90° with respect to an equatorial plane of the tire (not shown).

Each side portion of the carcass ply 1 is wound around a bead core 3 embedded in the bead portion 2 from an inside of the tire toward an outside thereof in a radial direction to form a wind contact part 4 around a peripheral face of the bead core 3 therealong.

In the illustrated embodiment, the wind contact part is formed by winding the carcass ply form the inside toward the outside in the widthwise direction of the tire, but it is possible to form the wind contact part by winding from the outside toward the inside in the widthwise direction of the tire.

In the formation of the wind contact part 4, it is favorable that at least one portion of the carcass ply corresponding to respective corner part of the bead core 3 is subjected to plastic deformation to thereby more exactly extend along the peripheral face of the bead core. As a result, the wind contact part 4 is effectively restrained by the bead core 3, whereby fears of getting out cords from the carcass ply and creating separation failure at the wind contact part can advantageously be eliminated.

Prior to the winding of the carcass ply 1 around the bead core 3, the plastic deformed position is favorable to be previously formed in a portion of the carcass ply corresponding to the wind contact part 4, whereby the plastic deformation can always and exactly be carried out as is expected and hence the above effect can be more enhanced.

Then, the wind contact part 4 is interposed between the bead core 3 and a bead filler 5 located at an outer peripheral side thereof and comprised of hard rubber stock 5a and soft rubber stock 5b, whereby the wind contact part 4 can be more closed to the bead core 3 through the bead filler 5 to more advantageously prevent the get-out of the cords and the separation failure at the wind contact part 4.

Preferably, the wind contact part 4 is extended along the peripheral face of the bead core 3 over a half periphery of a sectional profile of the bead core, whereby the above effect can be more developed. Moreover, the bead core 3 usually has a sectional profile shape such as polygon, circle or the like.

In the illustrated embodiment, two steel cord reinforcing layers 7 (hereinafter referred to as a wire chafer) are arranged in the bead portion 2 so as to extend outward from an inner peripheral side portion of the bead core 3 along the carcass ply 1 in the widthwise direction of the tire and arrive at an outer peripheral side exceeding over an outer peripheral edge of a contact zone between an outer surface of the bead portion and a rim flange 6 in the radial direction and also two steel cord reinforcing layers 9 (wire chafer) are arranged at an inside of the bead portion 2 in the widthwise direction of the tire and in an inner peripheral zone from an outer end of the bead filler 5 in the radial direction so as to sandwich a main body 8 of the carcass ply 1 therebetween from a thickness direction thereof. Moreover, the wire chafer 9 may be further extended outward from the outer end of the bead filler in the radial direction.

The term "contact zone with the rim flange" used herein means a maximum contact zone of the outer surface of the bead portion in the running of the tire under loading.

According to the above arrangement of the wire chafers 7, 9, when load is applied to the bead portion 2 in the running of the tire under loading, the wire chafer 7 located outside in the widthwise direction of the tire acts to control the flowing of rubber in the radial direction/widthwise direction of the tire at the contact zone with the rim flange and the displacement into the equatorial direction of the tire, while the wire chafer 9 located inside in the widthwise direction of the tire acts to control the fall-down of the bead portion outward in the widthwise direction of the tire-(i.e. increasing the rigidity).

As a result, the lateral rigidity of the bead portion 2 is increased to effectively control the fall-down deformation of the bead portion outward in the widthwise direction of the tire, so that fatigues in the outer surface part of the bead portion contacting with the vicinity of the outer peripheral edge of the rim flange 6 and in a bead heel part contacting with a base part of the rim flange 6 can sufficiently be controlled to largely improve the bead portion durability.

When the cords are crossed with each other and extended in opposite directions between the two wire chafers 7 and between the two wire chafers 9, preferably among the wire chafers 7, 9 and the carcass ply 1, the wire chafers 7 or 9 are deformed so as to control their movements and hence the effect of controlling the fall-down deformation outward in the widthwise direction of the bead portion is more increased.

Moreover, either the wire chafers 7 and 9 shown in FIG. 2 can be omitted. For example, when the wire chafers 7 are omitted, it is favorable that an inner end of the wire chafer 9 located between the main body 8 of the carcass ply 1 and the bead filler 5 in the radial direction is positioned in the vicinity of the bead core 3 and an inner end portion of the other wire chafer 9 in the radial direction is positioned along the inner peripheral side of the bead core 3 and fastened through the bead core 3 as shown in FIG. 3 for enhancing the effect of controlling the fall-down deformation.

Figure 3:
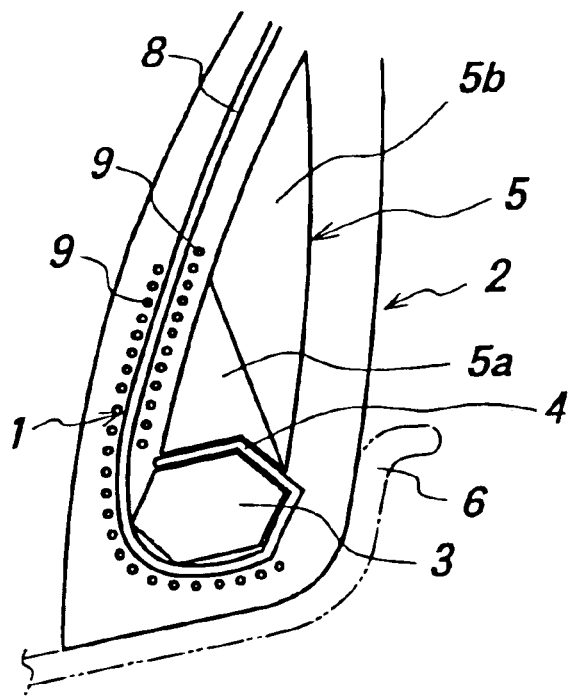
FIG. 3 is a diagrammatically section view illustrating a second embodiment of the bead portion structure in the pneumatic tire according to the invention.

FIGS. 4a to 4c are modified embodiments of FIG. 3, wherein the arrangement of the wire chafers 9 is changed together with the change in the arrangement of the hard rubber stock 5a and soft rubber stock 5b constituting the bead filler 5 while rendering the wind contact part 4 of the carcass ply 1 into an approximately elliptical form.

In the embodiment of FIG. 4a, the other wire chafer 9 as shown in FIG. 3 is turned up through the inner peripheral side of the bead core 3 upward in the radial direction of the tire at the outside in the widthwise direction thereof.

FIG. 4b is a further modified embodiment of FIG. 4a, wherein two additional reinforcing layers 10 made of organic fiber cords such as nylon fiber cords and the like are extended from the inner peripheral side of the bead core 3 upward in the radial direction of the tire at the outside in the widthwise direction thereof so as to hold down the other wire chafer 9 and outer ends of the additional reinforcing layers 10 in the radial direction located at the outside in the widthwise direction are positioned upward from the outer end of the other wire chafer 9 in the radial direction.

In the embodiment of FIG. 4c, the wire chafers 9 are arranged in the same manner as in FIG. 3 and two additional reinforcing layers 10 made of nylon fiber cords are located at outer peripheral sides of the wind contact part 4 of the carcass ply 1 and the other wire chafer 9 and wound around the bead core 3 from the inside of the tire toward the outside thereof in the radial direction.

In any case of the above bead portion structures, the separation failure at the wind contact part 4 of the carcass ply 1 is sufficiently prevented, and also the fatigue breakage of the bead portion can advantageously be eliminated to considerably improve the bead portion durability.

Figure 5:
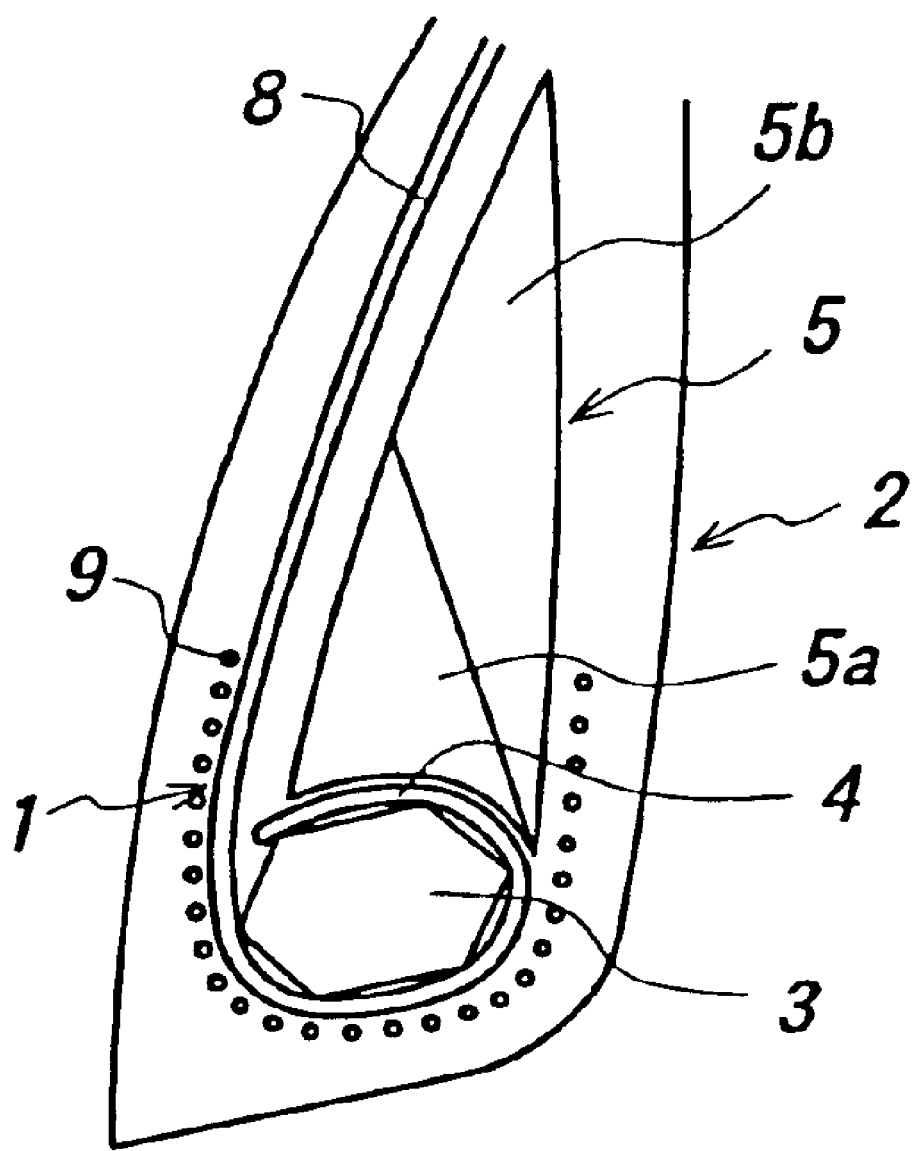
FIG. 5 is a diagrammatically section view illustrating a third embodiment of the bead portion structure in the pneumatic tire according to the invention.

FIG. 5 shows a case that a single steel cord reinforcing layer or wire chafer 9 is arranged in the bead portion 2 along the main body 8 and wind contact part 4 of the carcass ply 1 and outward in the radial direction of the tire at the outside in the widthwise direction thereof.

Figure 6:
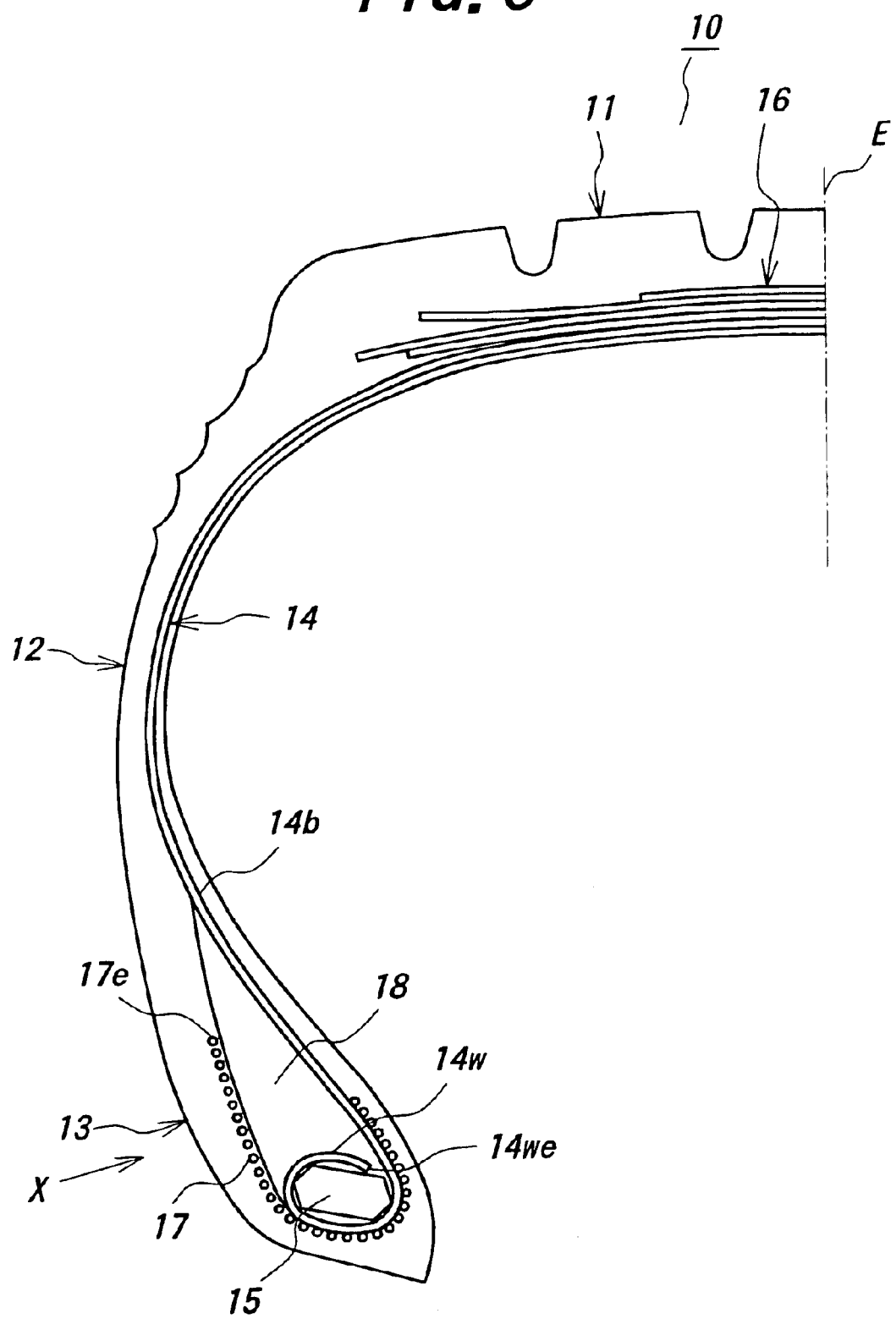
FIG. 6 is a diagrammatically left-half section view of an embodiment of the pneumatic tire according to the invention.

In FIG. 6 is shown a diagrammatically left-half section of an embodiment of the pneumatic tire according to the invention. This tire 10 comprises a tread portion 11, a pair of sidewall portions 12, a pair of bead portions 13, and a radial carcass 14 comprised of one rubberized steel cord ply extending between a pair of bead cores 15 embedded in the respective bead portions 13 and reinforcing the above portions 11 to 13. Furthermore, the tire 10 comprises a belt 16 arranged on an outer periphery of the carcass 14 for reinforcing the tread portion 11 and one or more steel cord reinforcing layers 17 (hereinafter referred to as wire chafer) reinforcing the bead portion 13, one steel cord reinforcing layer 17 in the illustrated embodiment. The wire chafer 17 is arranged so as to extend from at least an outside of the tire in a widthwise direction thereof to an inside of a main body 14b of the carcass 14. In FIG. 6, numeral 18 is a stiffener rubber or bead filler, and symbol E is an equatorial plane of the tire.

In the tire 10, the carcass 14 is wound around the bead core 15 from an inside of the tire toward an outside thereof in the widthwise direction to form a wind contact part 14w along an outer peripheral face of the bead core 15. The wind contact part 14w has a terminal end 14we in the vicinity of the main body 14b of the carcass 14 at an outer peripheral position of the bead core 15.

Figure 7:
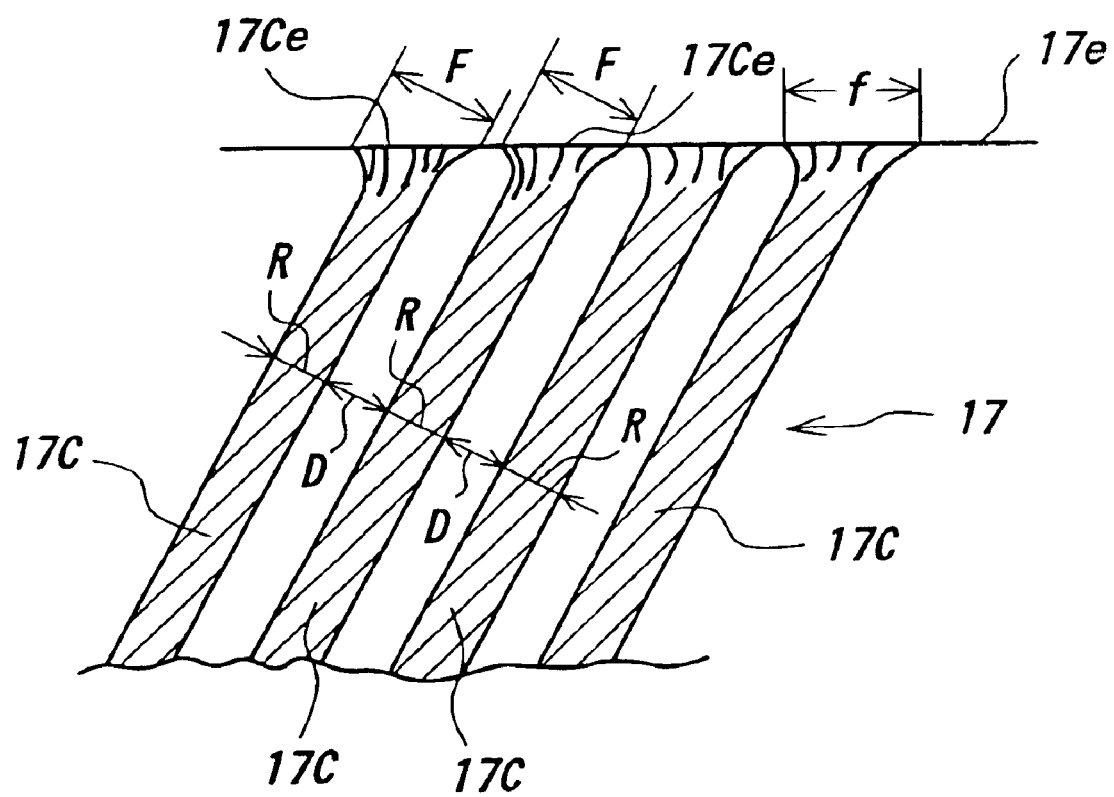
FIG. 7 is a schematically partial side view of a steel cord reinforcing layer perspectively drawn from a direction of arrow X in FIG. 6.

As shown in FIG. 7, the steel cord reinforcing layer 17 has many steel cords 17C each having only a strand structure without using a helically wrapped filament, wherein these steel cords 17C are arranged at a given inclination cord angle with respect to the radial direction of the tire 10. Each of the steel cords 17C has a cord diameter R within a range of 1.00–1.50 mm.

Further, the steel cord 17C at a turnup end 17e of the wire chafer 17 has a flare f at its cut end 17Ce. This flare f indicates a longitudinally scattered length f at the turnup end 17Ce when the steel cord 17C is cut by means of a cutting tool as defined in "Testing method of steel tire cord" of JIS G3510 (1992). In the invention, a component of a width F (mm) in a direction perpendicular to an axis of the cord 17C is adopted as the flare f. The flare f has a scattering width F corresponding to 1.0–1.5 times the cord diameter R.

Moreover, many steel cords 17C are arranged in the wire chafer 17 in such a manner that a distance D in a direction perpendicular to the axis of the cord 17C between the cords 17C located inward from the turnup end 17Ce in the radial direction is within a range of 1.00–1.50 mm. Preferably, the cord distance D is equal to the cord diameter R. And also, a coating rubber is filled in the cord distance D.

The tire 10 having the above structure develops the following effects (1)–(4)

(1) Since the wind contact part 14w of the carcass 14 has a terminal end, strain applied to the terminal end becomes very small and there is no fear of causing cracks at this terminal end.

(2) The wire chafer 17 is formed by arranging the steel cords 17C each having a diameter R of 1.00–1.50 mm at a cord distance D of 1.00–1.50 mm, so that the sufficient bead portion reinforcing effect can be obtained without causing problems in the production. Even if crack is created at the turnup end 17Ce of the steel cord 17C, the crack hardly connects between the adjoining turnup ends 17Ce and hence the occurrence of separation failure is prevented.

(3) If the crack created at the turnup end 17Ce grows along the axis of the cord 17C, since the steel cord has no wrapping filament serving as a mediation connecting cracks of adjoining cords to each other, the connection between adjoining cracks is obstructed to control the occurrence of separation failure.

(4) Since the turnup end 17Ce of the steel cord 17C has a scattering width F corresponding to 1.0–1.5 times the cord diameter R, strain applied to the turnup end 17Ce is dispersed into individual filaments constituting the cord in the running of the tire under loading to largely control the occurrence of crack at the turnup end 17Ce.

The resistance to separation at turnup end (17Ce) portion of the wire chafer 17 is considerably improved by the combination of the above items (2)–(4) and hence the excellent bead portion durability can be obtained.

When the diameter R of the steel cord 17C is less than 1.00 mm, the end count should be increased for ensuring the strength and rigidity of the wire chafer 17 and the increase of the end count considerably reduces the distance D between the cords 17C and hence the created cracks are apt to be connected to each other to easily bring about the occurrence of separation failure, while when it exceeds 1.50 mm, the bending rigidity of the cord 17C becomes too high and it is difficult to bend the wire chafer 17 in the tire building.

When the cord distance d is less than 1.00 mm, the cracks are apt to be easily connected to each other as mentioned above, which easily brings about the occurrence of separation failure, while when it exceeds 1.50 mm, the strength and rigidity of the wire chafer 17 considerably lower and the effect by the wire chafer 17 can not be obtained.

And also, the case that the scattering width F is less than 1.0 times the cord diameter R is not actually existent, while when it exceeds 1.5 times, the filaments constituting the cord are scattered in a long region ranging inward form the turnup end 17Ce in the longitudinal direction of the cord 17C to cause disengagement of the cord 17C and hence troubles are caused at the tire production steps.

The steel cord 17C is suitable to have a Z-lay outer-sheath structure. Because, the outer-sheath is a strand layer located on the surface of the cord and if the filaments on this surface layer are an S-lay, strain applied to the cord in the running of the tire under loading turns toward a direction going away from the cord and hence crack growing along the axis of the cord is apt to be easily connected to crack created in the adjoining cord.

Figure 8:
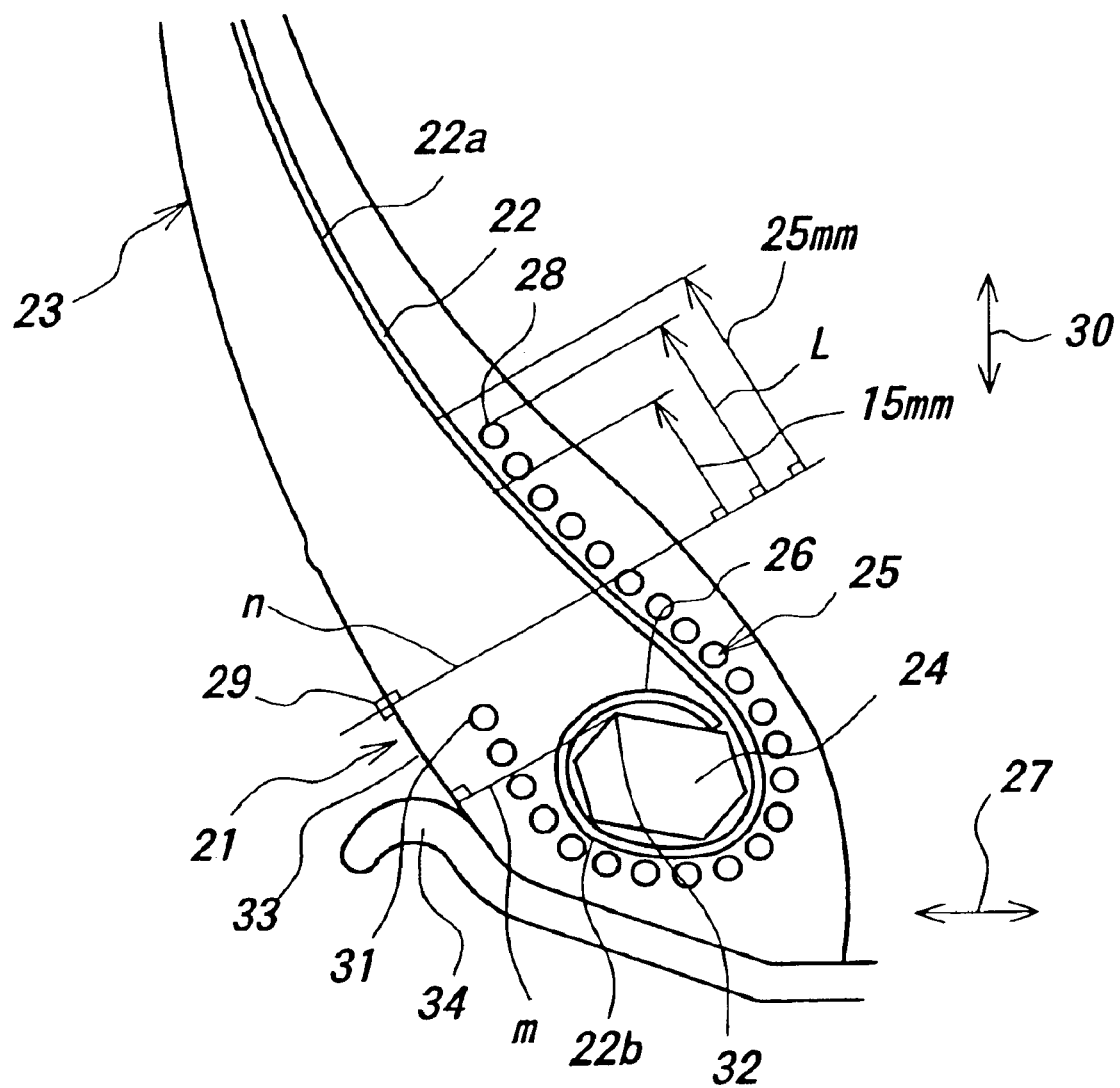
FIG. 8 is a diagrammatically section view illustrating a fourth embodiment of the bead portion structure in the pneumatic tire according to the invention.

Then, a bead portion in another embodiment of the pneumatic tire according to the invention is sectionally shown in FIG. 8, wherein numeral 21 is a bead portion, numeral 22 a carcass ply, numeral 23 a sidewall portion, numeral 24 a bead core, and numeral 25 a steel cord reinforcing layer or wire chafer.

In the tire of FIG. 8, at least one rubberized carcass ply 22 containing steel cords arranged substantially in a radial direction (concretely at a cord angle of 70–90° with respect to an equatorial plane of the tire) is constructed with a main body 22a toroidally extending between a pair of bead cores 24 and reinforcing the bead portion 21, sidewall portion 23 and a tread portion (not shown) and a turnup portion 22b wound around the bead core 24 along an outer peripheral face thereof, and also a belt (not shown) comprised of at least one rubberized cord layer is arranged on a crown portion (not shown) of the carcass ply 21 for reinforcing the tread portion. According to the invention, a wind contact part 26 wound around the bead core 24 along an outer peripheral face thereof is formed in the turnup portion 22b of the carcass ply 22, whereby the bead portion durability can be improved.

Figure 1:
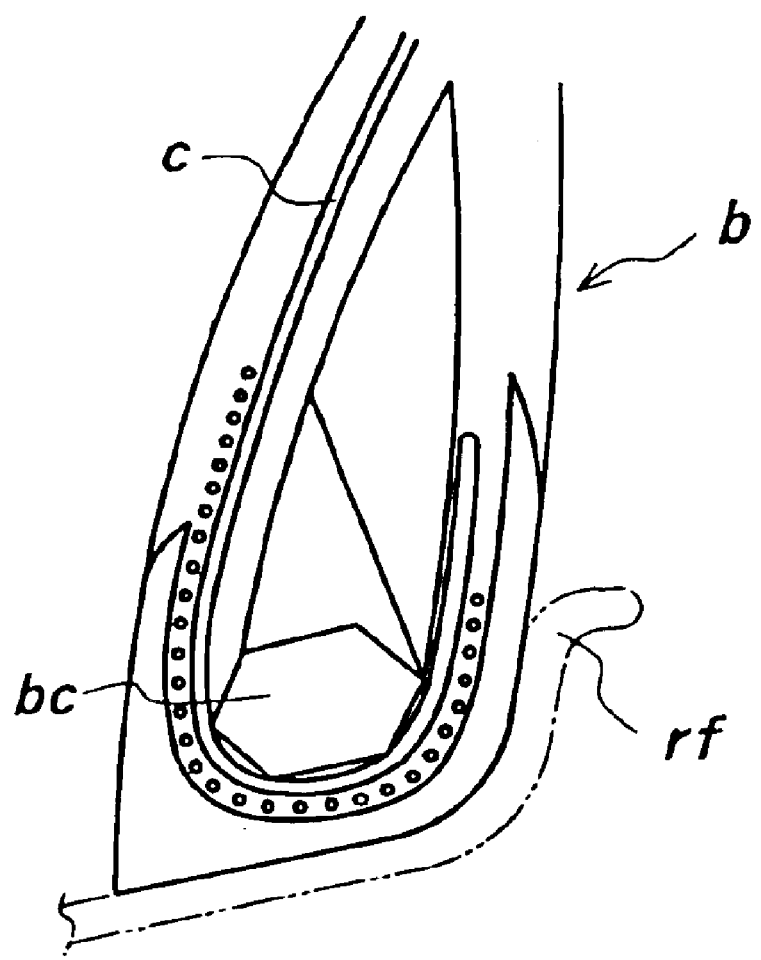
FIG. 1 is a diagrammatically section view illustrating a structure of a bead portion in the conventional tire.

That is, the getting-out of the cords from the carcass ply 22 and the occurrence of separation failure at the turnup end of the carcass ply 22 can be prevented by forming the wind contact part 26 in the turnup portion of the carcass ply 22, whereby the bead portion is considerably strengthened as compared with the conventional tire having the usual turnup structure of the carcass as shown in FIG. 1.

However, when a higher load is applied to the tire having only the wind contact part as mentioned above, a large bending deformation at the rim flange 34 as a fulcrum can not effectively be controlled and hence it is apt to cause cracks in the bead portion 21 contacting with the rim flange 34 by repetition of such a bending deformation.

For this end, according to the invention, at least one steel cord reinforcing layer or wire chafer 25 is arranged in the bead portion 21 so as to extend along the main body 22a of the carcass ply 22 toward the turnup portion 22b thereof and turn around the bead core 24 from an inside of the tire toward an outside thereof in a widthwise direction 27, wherein a start end 28 of the wire chafer 25 located at the main body side of the carcass ply 22 is arranged so that a shortest distance L measured outward from a normal line n drawn at a first rim line position 29 to an outer face 33 of the bead portion 21 in a radial direction 30 of the tire is positioned within a range of 15–25 mm, while a terminal end 31 of the wire chafer 25 located at the turnup portion side of the carcass ply 22 is arranged so as to position within a range sandwiched between a vertical line m drawn from an outermost end position 32 of the bead core 24 in the radial direction to the outer face 33 of the bead portion 21 and the above normal line n. Thus, the above bending deformation can effectively be controlled to considerably improve the bead portion durability.

The reason why the start end 28 of the wire chafer 25 is positioned within the range of shortest distance L of 15–25 mm is due to the fact that when the shortest distance L is less than 15 mm, the circumferential deformation of the carcass ply can not sufficiently be controlled and hence the bending rigidity of the bead portion becomes large to easily cause troubles in the bead portion, while when it exceeds 25 mm, the start end 28 approaches to a flex zone of the tire, particularly low-section profile tire and hence stress concentrates in the star end 28 of the wire chafer 25 to easily cause separation failure.

On the other hand, the reason why the terminal end 31 of the wire chafer 25 is positioned between the vertical line n and the normal line m is due to the fact that when the terminal end 31 is located down ward from the vertical line m in the radial direction of the tire, the turnup portion 22b of the carcass ply 22 can not sufficiently be protected and separation failure at an interface between the terminal end 31 and the turnup portion 22b is apt to be caused, while when it is located upward from the normal line n in the radial direction, a large shearing strain is applied to the terminal end 31 to easily cause troubles in the bead portion.

Figure 9:
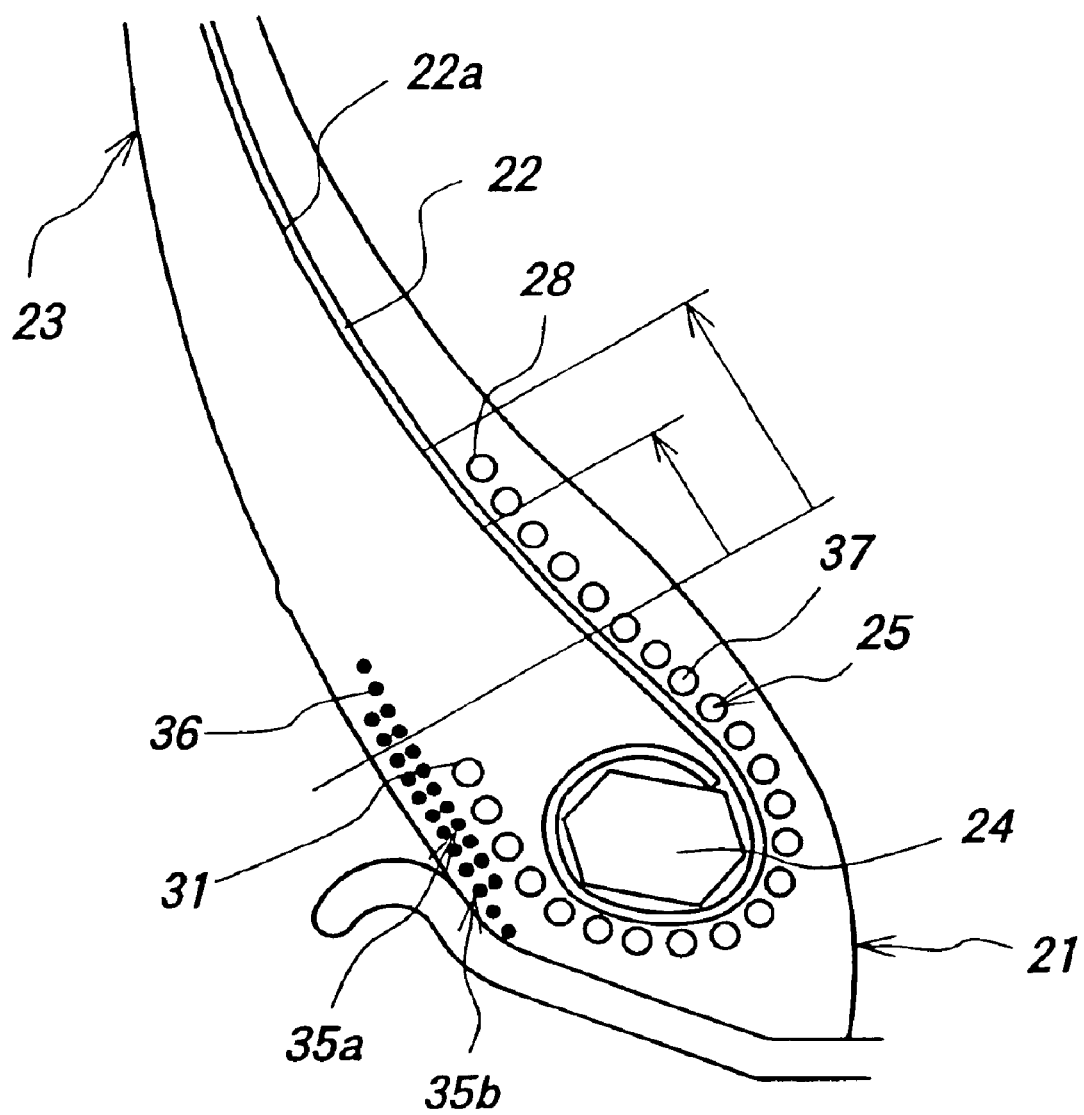
FIG. 9 is a diagrammatically section view illustrating a fifth embodiment of the bead portion structure in the pneumatic tire according to the invention.

As shown in FIG. 9, at least one organic fiber chafer, two organic fiber chafers 35a, 35b in the illustrated embodiment covering a terminal end 31 of the wire chafer 25 may be arranged at the turnup portion side of the carcass ply 22. In this case, shearing strain at the terminal end 31 of the wire chafer 25 can be more suppressed to further improve the bead portion durability.

When organic fiber cords 36 in the organic fiber chafers 35a, 35b are arranged at a cord angle of 15–75° with respect to a cord arranging direction of the wire chafer 25, they can bear force applied from various directions to the terminal end portion of the wire chafer 25 and hence shearing strain at the terminal end 31 of the wire chafer 25 can be more suppressed.

Figure 10:
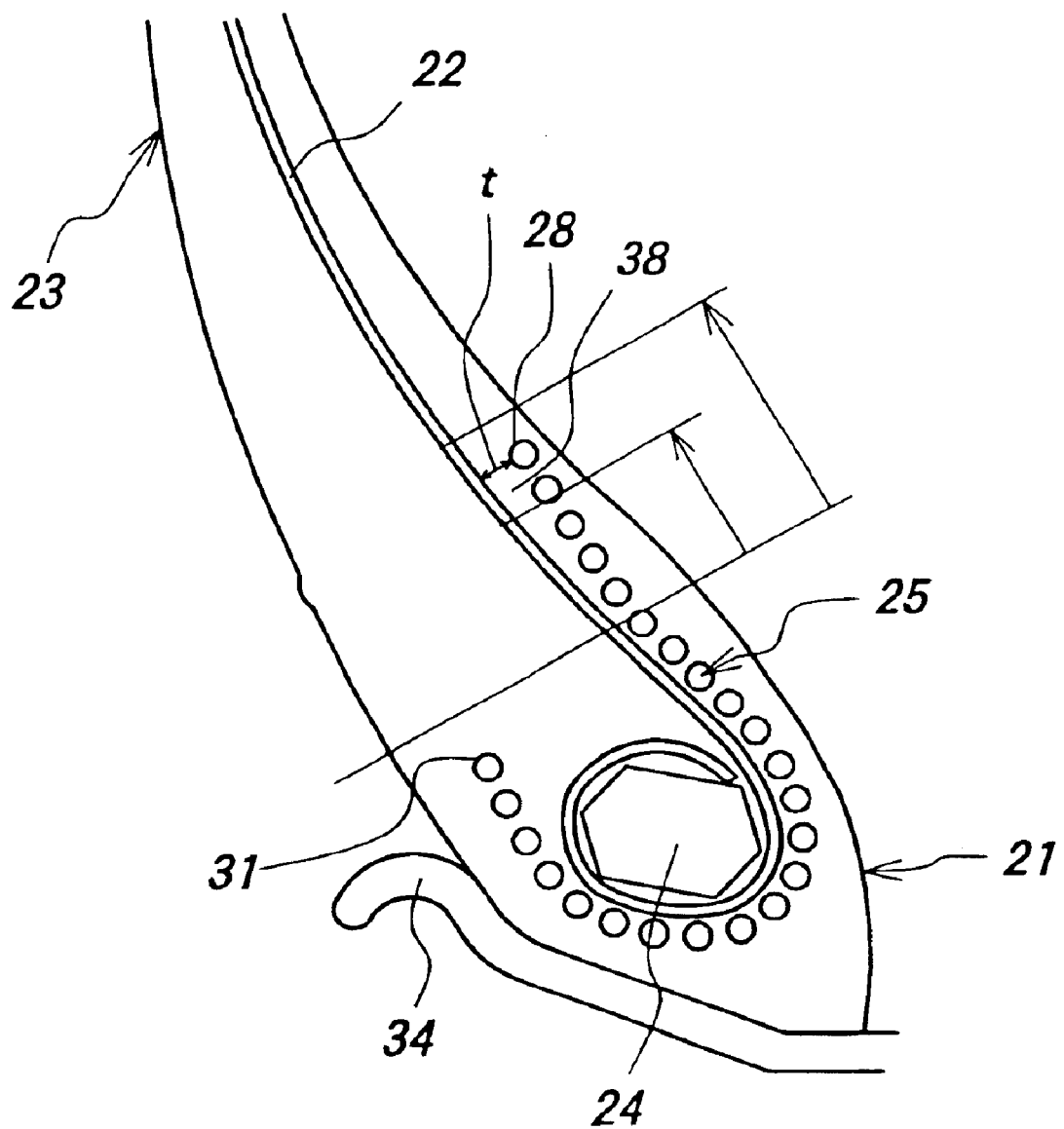
FIG. 10 is a diagrammatically section view illustrating a sixth embodiment of the bead portion structure in the pneumatic tire according to the invention.

In case that it is required to more control the separation failure at the start end 28 of the wire chafer 25, as shown in FIG. 10, a cushion rubber layer 38 may be interposed between the main body 22a of the carcass ply 22 and the star end portion of the wire chafer 25.

Moreover, it is favorable that a rubber gauge t of the cushion rubber layer 38 at a position corresponding to the start end 28 of the wire chafer 25 is 1.5–2.0 mm at a section in the widthwise direction of the tire. When the rubber gauge t is less than 1.5 mm, the effect of controlling separation failure by arranging the cushion rubber layer 38 can not sufficiently be obtained, while when it exceeds 2.0 mm, there is cased a fear that the effect of controlling the circumferential deformation by the wire chafer 25 can not sufficiently be obtained.

The following examples are given in illustration of the invention and are not intended as limitations thereof.

EXAMPLES 1

Figure 4:
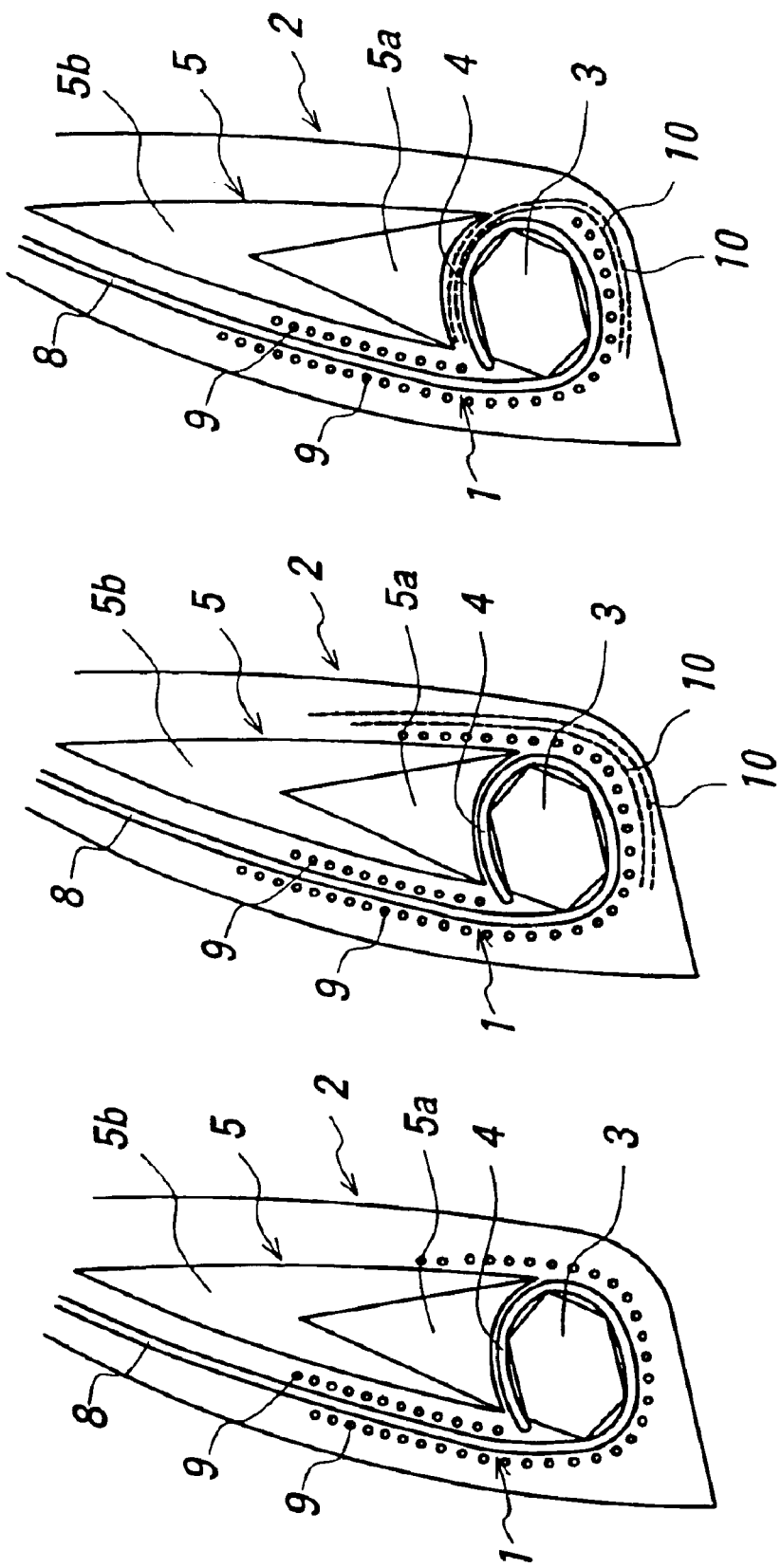
FIGS. 4a to 4c are diagrammatically section views of various modified embodiments of the bead portion structure shown in FIG. 3, respectively.

A test for evaluating a bead portion durability on a drum is carried out with respect to tires of Examples 14 having a bead portion structure as shown in FIGS. 4 and 5 and a conventional tire of FIG. 1 to obtain results as shown in Table 1. The result is represented by an index on the basis that the conventional tire is 100, wherein the larger the index value, the better the durability.

In this test, a tire to be tested having a tire size of 285/60R22.5 is assembled onto a rim having a rim width of 9.00×22.5 and inflated under an air pressure of 900 kPa and run on the drum under a load of 3150 kgf×1.5 until separation failure is created in an outer surface part of the bead portion contacting with a rim flange due to flatting (rubber flowing).

TABLE 1

| Tire | Example 1 | Example 2 | Example 3 | Example 4 | Conventional tire |
|---|---|---|---|---|---|
| Structure | FIG. 4a | FIG. 4b | FIG. 4c | FIG. 5 | FIG. 1 |
| Bead portion durability (index) | 175 | 170 | 185 | 160 | 100 |

As seen from Table 1, all example tires have a considerably improved bead portion durability as compared with the conventional tire because the effect of preventing separation failure at the turnup end of the carcass ply and the effect of preventing the fatigue breakage are improved.

EXAMPLES 5–9, COMPARATIVE EXAMPLES 1–5

There are provided radial ply tires for truck and bus of Examples 5–9 having a tire size of 315/60R22.5 and a structure as shown in FIGS. 6 and 7. In order to confirm the effect of the example tire, there are provided a conventional tire having a structure shown in FIG. 1 and tires of Comparative Examples 1–5 having the structure shown in FIG. 6 but parts outside the adequate ranges.

With respect to steel cords 17C of a steel cord reinforcing layer 17 in these tires, cord diameter R (mm), distance D between cords (mm), ratio of scattering width F (mm)/cord diameter R (mm) and lay direction (Z or S) in outer-sheath are shown in Table 2.

With respect to these tires, a durability test on a drum under higher internal pressure and load is carried out to evaluate a bead portion durability. In this case, the running distance until the occurrence of trouble in bead portion is measured and evaluated by an index on the basis that the conventional tire is 100, wherein the larger the index value, the better the durability. And also, the cause on the trouble in the bead portion is observed and specified as separation at turnup end of carcass ply or separation at terminal end of wire chafer. The former separation is represented by SEP. at turnup end and the latter separation is represented by SEP. at terminal end. These results are also shown in Table 2.

TABLE 2

| Items | Conventional tire | Comparative Example | | | | | Example | | | | |
|---|---|---|---|---|---|---|---|---|---|---|---|
| | | 1 | 2 | 3 | 4 | 5 | 5 | 6 | 7 | 8 | 9 |
| Cord diameter R (mm) | 0.80 | 0.80 | 1.23 | 1.23 | 0.80 | 1.77 | 1.32 | 1.41 | 1.41 | 1.05 | 1.05 |
| Distance between cords D (mm) | 0.73 | 0.73 | 0.88 | 1.93 | 1.45 | 1.45 | 1.25 | 1.41 | 1.15 | 1.44 | 1.44 |
| F (mm)/R (mm) | 1.05 | 1.05 | 1.05 | 1.71 | 1.05 | 1.71 | 1.33 | 1.38 | 1.38 | 1.20 | 1.40 |

TABLE 2-continued

| Items | Conventional tire | Comparative Example | | | | | Example | | | | |
|---|---|---|---|---|---|---|---|---|---|---|---|
| | | 1 | 2 | 3 | 4 | 5 | 5 | 6 | 7 | 8 | 9 |
| Lay direction | S | S | S | S | S | Z | Z | Z | Z | Z | Z |
| Bead portion durability (index) | 100 | 105 | 73 | tire production is impossible | | | 147 | 165 | 151 | 155 | 159 |
| Trouble cause | SEP. at turnup end | SEP. at terminal end | SEP. at terminal end | | | | SEP. at terminal end | SEP. at terminal end | SEP. at terminal end | SEP. at terminal end | SEP. at terminal end |

As seen from table 2, all example tires are considerably superior in the bead portion durability to the conventional tire, while tires of Comparative Examples 3–5 can not actually be produced and the tires of Comparative examples 1–2 are equal to or less than the conventional tire in the bead portion durability.

EXAMPLES 10–16 COMPARATIVE EXAMPLES 6–10

There are provided pneumatic tires of Examples 10–16 having a tire size of TBR 315/60R22.5 and then a bead portion durability thereof is evaluated by the following method.

In these tires, positions of start end 28 and terminal end 31 of wire chafer 25, presence or absence and rubber gauge t of cushion rubber layer 38, presence or absence and cord angle of organic fiber chafer 35 are shown in Table 3.

For the comparison, there are provided a conventional tire shown in FIG. 1 and comparative tires (Comparative Examples 6–10) wherein either start end position or terminal end position of wire chafer is outside the range defined in the invention.

The tire to be tested is assembled onto a rim of 9.00×22.5 and subjected to a test for measuring circumferential deformation and a drum test for bead portion durability to evaluate the bead portion durability.

In the test for measuring the circumferential deformation, a circumferential displacement is measured under a condition that the tire is freely pushed down by a force 66.15 kN from the top. The measured value is represented by an index on the basis that the conventional tire is 100, wherein the smaller the index value, the smaller the circumferential displacement.

In the drum test for bead portion durability, the tire is run on a rotating drum at a speed of 60 km/h under conditions of internal pressure: 900 kPa and load: 66.15 kN to measure a running distance until the occurrence of tire trouble. The running distance is represented by an index on the basis that the conventional tire is 100, wherein the larger the index value, the better the durability.

The measured results are also shown in Table 3.

TABLE 3

| | Wire chafer 25 | | Cushion rubber layer 38 | | Organic fiber chafer | | Bead portion durability | |
|---|---|---|---|---|---|---|---|---|
| | position of start end 28 | position of terminal end 31 | arrangement | rubber gauge | arrangement | cord angle | index of circumferential deformation | index of drum test for bead portion durability |
| Conventional tire | L = 0 mm | normal line n + 10 mm | absence | — | absence | — | 100 | 100 |
| Comparative Example 6 | L = +30 mm | normal line n − 5 mm | presence | 1.5 | absence | — | 61 | 105 (peculiar trouble) |
| Comparative Example 7 | L = +20 mm | vertical line m − 5 mm | absence | — | absence | — | 80 | 105 (peculiar trouble) |
| Comparative Example 8 | L = +20 mm | normal line n + 5 mm | presence | 1.0 | absence | — | 81 | 110 (peculiar trouble) |
| Comparative Example 9 | L = +20 mm | normal line n + 5 mm | presence | 2.5 | absence | — | 90 | 112 (peculiar trouble) |
| Comparative Example 10 | L = +20 mm | vertical line m − 5 mm | absence | — | absence | — | 55 | 88 (peculiar trouble) |
| Example 10 | L = +15 mm | normal line n − 5 mm | presence | 1.5 | absence | — | 89 | 158 |
| Example 11 | L = +20 mm | normal line n − 5 mm | presence | 2.0 | absence | — | 83 | 192 |
| Example 12 | L = +25 mm | normal line n − 5 mm | presence | 1.5 | absence | — | 77 | 173 |
| Example 13 | L = +20 mm | on normal line n | absence | — | absence | — | 75 | 121 |
| Example 14 | L = +20 mm | normal line n − 5 mm | absence | — | absence | — | 69 | 140 |
| Example 15 | L = +20 mm | on vertical line m | absence | — | absence | — | 64 | 152 |
| Example 16 | L = +20 mm | on normal line n | absence | — | presence *1 | ±45° | 52 | 170 |

*1 Two nylon chafers, shortest distance between m and n is 10 mm.

As seen from Table 3, all example tires are excellent in the bead portion durability as compared with the conventional tire. On the other hand, peculiar trouble is caused when the tires of Comparative Examples 6–10 are subjected to the drum test for bead portion durability.

As mentioned above, according to the invention, there can be provided pneumatic tires having a considerably improved bead portion durability by combining the wind contact part of the radial carcass ply with the steel cord reinforcing layer for the bead portion. Particularly, the invention is suitable for pneumatic radial tires used in heavy duty vehicles such as truck, bus and the like running under higher internal pressure and load.

What is claimed is:

1. In a pneumatic tire comprising a tread portion, a pair of sidewall portions and a pair of bead portions and a carcass toroidally extending between a pair of bead cores embedded in the respective bead portions and comprised of at least one rubberized carcass ply containing at least one steel cord therein, in which the carcass ply has a wound portion which is wound around the bead core from an inside of the tire toward an outside thereof and said wound portion has a terminal end in the vicinity of a main body of the carcass ply at an outer peripheral position of the bead core, wherein at least one steel cord reinforcing layer is arranged in the bead portion, and at least one reinforcing layer located inside in a widthwise direction of the tire among the at least one steel cord reinforcing layer is arranged along the main body of the carcass ply and is continuous to turnup around the bead core from the inside toward the outside in the widthwise direction, and a terminal end of the at least one reinforcing layer located outside in the widthwise direction is arranged away from the terminal end of the carcass ply, wherein the main body of the carcass ply is sandwiched between the at least one reinforcing layer and another reinforcing layer in a thickness direction thereof.

2. A pneumatic tire according to claim 1, wherein steel cords constituting the at least one reinforcing layer are extended in a direction opposite to at least one of a cord extending direction of another reinforcing layer and a cord extending direction of the carcass ply.

3. In a pneumatic tire comprising a tread portion, a pair of sidewall portions and a pair of bead portions and a carcass toroidally extending between a pair of bead cores embedded in the respective bead portions and comprised of at least one rubberized carcass ply containing at least one steel cord therein, in which the carcass ply has a wound portion which is wound around the bead core from an inside of the tire toward an outside thereof and said wound portion has a terminal end in the vicinity of a main body of the carcass ply at an outer peripheral position of the bead core, wherein at least one steel cord reinforcing layer is arranged in the bead portion, and at least one reinforcing layer located inside in a widthwise direction of the tire among the at least one steel cord reinforcing layer is arranged along the main body of the carcass ply and is continuous to turnup around the bead core from the inside toward the outside in the widthwise direction, and a terminal end of the at least one reinforcing layer located outside in the widthwise direction is arranged away from the terminal end of the carcass ply, wherein a cushion rubber layer is interposed between the main body of the carcass ply and a start end portion of the at least one reinforcing layer.

4. A pneumatic tire according to claim 3, wherein steel cords constituting the at least one reinforcing layer have a cord diameter of 1.00–1.50 mm, and an end of the steel cords at the terminal end of the at least one reinforcing layer is within a range of 1.0–1.5 times the cord diameter.

5. A pneumatic tire according to claim 4, wherein the steel cords are arranged in the at least one reinforcing layer at a distance between an outer diameter of each of at least two adjacent cords of 1.00–1.50 mm in a direction perpendicular to a longitudinal axis of the cord.

6. A pneumatic tire according to claim 3, wherein the steel cord constituting the at least one reinforcing layer is a Z-lay outer-sheath structure.

7. A pneumatic tire according to claim 3, wherein at least one organic fiber chafer is arranged at a side of the wound portion so as to cover the terminal end of the at least one reinforcing layer.

8. A pneumatic tire according to claim 7, wherein organic fiber cords constituting the at least one organic fiber chafer are arranged at a cord angle of 15–75° with respect to an arranging direction of the steel cords constituting the at least one reinforcing layer.

9. A pneumatic tire according to claim 3, wherein the cushion rubber layer at the position of the start end of the at least one reinforcing layer has a rubber gauge of 1.5–2.0 mm viewing a section in the widthwise direction of the tire.

10. A pneumatic tire according to claim 3, wherein the terminal end of the at least one reinforcing layer is arranged outward from the terminal end of the carcass ply in the widthwise direction of the tire.

11. A pneumatic tire according to claim 10, wherein the terminal end of the at least one reinforcing layer is arranged outward from an outermost end position of the bead core in the widthwise direction of the tire.

12. A pneumatic tire according to claim 3, wherein the terminal end of the at least one reinforcing layer is arranged upward from the terminal end of the carcass ply in a radial direction of the tire.

13. A pneumatic tire according to claim 3, wherein steel cords constituting the at least one reinforcing layer are extended in a direction opposite to a cord extending direction of the carcass ply.

14. In a pneumatic tire comprising a tread portion, a pair of sidewall portions and a pair of bead portions and a carcass toroidally extending between a pair of bead cores embedded in the respective bead portions and comprised of at least one rubberized carcass ply containing at least one steel cord therein, in which the carcass ply has a wound portion which is wound around the bead core from an inside of the tire toward an outside thereof and said wound portion has a terminal end in the vicinity of a main body of the carcass ply at an outer peripheral position of the bead core, wherein at least one steel cord reinforcing layer is arranged in the bead portion, and at least one reinforcing layer located inside in a widthwise direction of the tire among the at least one steel cord reinforcing layer is arranged along the main body of the carcass ply and a lower terminal end thereof in a radial direction of the tire is located above a position corresponding to the bead core, and at least another reinforcing layer located downside in the radial direction of the tire among the at least one cord reinforcing layer is arranged to turnup around the bead core from the inside toward the outside in the widthwise direction and a terminal end thereof located outside in the widthwise direction is arranged away from the terminal end of the carcass ply.

15. A pneumatic tire according to claim 14, wherein the main body of the carcass ply is sandwiched between the at least one reinforcing layer and another reinforcing layer in a thickness direction thereof.

16. A pneumatic tire according to claim 15, wherein steel cords constituting the at least one reinforcing layer are extended in a direction opposite to at least one of a cord extending direction of another reinforcing layer and a cord extending direction of the carcass ply.

17. A pneumatic tire according to claim 14, wherein steel cords constituting the at least one reinforcing layer have a cord diameter of 1.00–1.50 mm, and an end of said steel cords at the terminal end of the at least one reinforcing layer is within a range of 1.0–1.5 times the cord diameter.

18. A pneumatic tire according to claim 17, wherein the steel cords are arranged in the at least one reinforcing layer at a distance between an outer diameter of each of at least two adjacent cords of 1.00–1.50 mm in a direction perpendicular to a longitudinal axis of the cord.

* * * * *